Feb. 8, 1966  M. VERNAY  3,233,736

ROTARY DRUM FILTERS

Filed Feb. 26, 1963

INVENTOR

Meyer Vernay

BY

ATTORNEYS

United States Patent Office 3,233,736
Patented Feb. 8, 1966

---

3,233,736
ROTARY DRUM FILTERS
Marc Vernay, 19 Rue Louis Ducroize,
Villeurbanne, France
Filed Feb. 26, 1963, Ser. No. 261,018
Claims priority, application France, Mar. 23, 1962,
42,420, Patent 1,325,820
8 Claims. (Cl. 210—404)

My invention relates to rotary drum filters and it more particularly concerns filters as used in relation with paper-making machines for whitening or recovering fibers and additives from backwaters thereof.

An object of my invention is to provide such a rotary filter which will realize a separate recovering of fibers on the one hand, and of additives on the other hand, whilst the outlet water is sufficiently purified to be rejected into sewers without any risk of pollution.

In accordance with my invention, a whitening and recovery drum filter for paper-making machines comprises: a cylindrical and hollow rotary drum rotating about hollow horizontal trunnions coaxial therewith and rigidly secured thereto; a plurality of internal radial partitions partially disposed in an inner hollow ring situated in the middle portion of said drum, the perforated peripheral wall of which is outwardly coated with a filtering cloth; a cylindrical collector inwardly facing said perforated wall of said rotary drum and opening at its middle portion into said inner hollow ring, said radial partitions extending out of said ring between said collector and said perforated wall; a vat containing water to be filtered into which said rotary drum is almost completely immersed; inside said drum and at its middle part two stationary devices of adjustable orientation along which said partitions ring may fluid-tight rotate, said two devices being the first one a bucket gathering water with additives and the second one a vacuum box receiving limpid water at its upper part; a pipe collecting clean waters at the lowermost inner point of said drum; and a discharge roller outwardly disposed at the emerging upper part of said drum and over which passes a filter cake of fibrous materials having been progressively deposited onto said rotary drum before being partly dried by suction effect when passing over said vacuum box.

The efficiency of the filter object of my invention is considerably improved with respect to conventional filters thanks to said vacuum box applying a constant suction to said filter cake. It will be apparent that such a filter may be also used for making paper from said partly dry sheet-shaped cake recovered at the upper part of the rotary drum.

Figure 1:
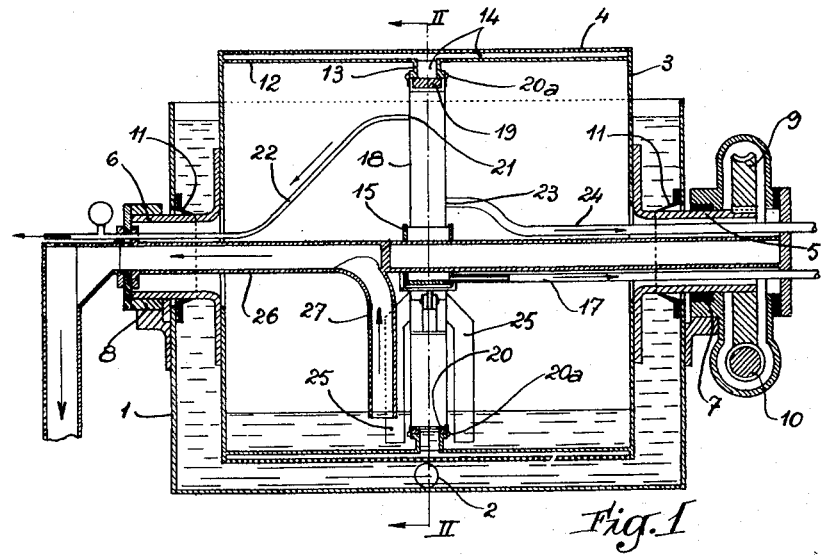
FIG. 1 is a sectional view taken along an axial vertical plane of a rotary drum filter according to my invention.
Figure 2:
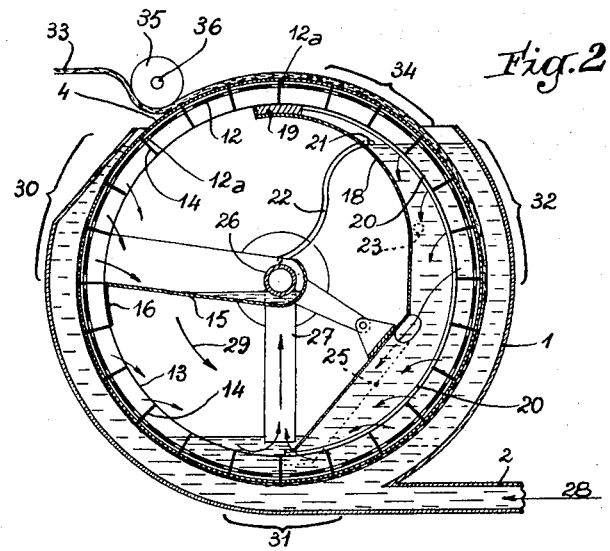
FIG. 2 is a cross-sectional view thereof along II—II (FIG. 1).

Water to be filtered is fed to a vat 1 through an inlet pipe 2 disposed at the lowermost point thereof.

A horizontally disposed filtering drum 3 is rotatably carried by vat 1 by means of hollow trunnions 5 and 6, the ends of which rest in bearings 7 and 8 rigidly secured to vat 1. Drum 3 comprises a perforated peripheral wall 4 outwardly covered with a filtering cloth, not illustrated.

A toothed gear 9 keyed on trunnion 5 meshes with an endless screw 10 which thus drives drum 3 into rotation. Lip-seals 11 prevent water leakages in the zone where trunnions 5 and 6 pass through the side walls of vat 1.

Within drum 3 is mounted a cylindrical collector 12 which faces the perforated wall 4 thereof and opens at its middle portion into a hollow ring 13 provided with a plurality of radial partitions 14 dividing the drum 3 into different sectors, circumferentially fluid-tight relative to each other. Every partition 14 extends on the whole length of drum 3 between its perforated wall 4 and said collector 12 and comprises a central portion directed inwardly and situated inside hollow ring 13. The communication between the hollow ring 13 and the annular space between wall 4 and collector 12 is realized by means of circular apertures 12a disposed on said collector 12 and surrounding the central portion of every partition 14.

Within drum 3 is further disposed a stationary and radially directed bucket 15, the angular position of which is adjustable. Bucket 15 comprises at its outermost end an arcuate flange 16, the length of which roughly corresponds to an interval between two adjacent partitions 14. This stationary flange 16 tightly engages the hollow ring 13 which slides thereon. The lowermost point of bucket 15 is situated near the rotation axis of drum 3, in order to permit the collected liquid to be drained out of drum 3 by means of a pipe 17 which projects outwardly through trunnion 5.

Within drum 3 is also disposed a stationary box 18, the position of which is angularly adjustable about the rotation axis of drum 3. Box 18 is slidably closed by the rotary ring 13 with which it is in fluid-tight contact, this contact being realized by means of shoes 19, 20 and of resilient lateral seals 20a. Box 18 is provided at its upper part with an aperture 21 connected by a pipe 22 with an outwardly situated vacuum pump, and it has at its middle portion an outlet aperture 23 through which water may flow out of drum 3 through a pipe 24 (FIG. 1) which passes through trunnion 5. Moreover, box 18 is provided at its lower part with two outlet tubes 25 opening on both sides of ring 13 near the lowermost generatrix of drum 3.

In the center of the hollow trunnions 5 and 6 is situated an outlet conduit 26 connected by a vertical pipe 27 with the lowermost part of drum 3, the inlet end of this pipe 27 being disposed near the outlet end of tubes 25.

Above drum 3 is situated a discharge roller 35 rotating about a horizontal shaft 36 parallel to the rotation axis of said drum 3.

The operation is as follows:

The water to be filtered containing additives and fibrous materials is fed into vat 1 through the inlet pipe 2, as indicated by arrow 28. Drum 3 is driven into rotation by means of the endless screw mechanism 9–10 in the direction indicated by arrow 29. It will thus be understood that water tends to flow inwardly into drum 3 whilst the fibers are retained by the filtering cloth which covers the porforated wall 4 whereon they settle. These fibers thus form a filter cake which builds up starting from the point where drum 3 dips into the water. This filter cake is very thin at the beginning, in the zone 30, but its thickness increases as it rotates with drum 3. It already becomes thicker when passing through the zone 31, and reaches its maximal thickness when emerging out of the water, in the zone 34. It is then only necessary to separate this filter cake from drum 3 to obtain a pulp sheet 33 and to expose the perforated wall 4 together with its filtering cloth. This pump sheet 33 is practically dry, as hereafter explained and it is stripped from drum 3 by passage on the stripper roller 35.

The exposed zone of wall 4 then dips again into the water for a new operative cycle.

The water flowing inwardly into drum 3 in zone 30 is collected in bucket 15 thanks to partitions 14 which co-act in fluid-tight relation with the arcuate flange 16. This water passes through the filtering cloth and the perforated wall 4 at a moment where the latter carries a very thin filter cake; this water thus contains a relatively high percentage of additives and it is drained out of drum 3 by means of pipe 17.

On the contrary, the water which flows later into drum 3, for example in zone 31, passes through a filter cake having a sufficient thickness to retain additives, so that only clear water then flows into drum 3. This clear water is permanently withdrawn by means of vertical pipe 27 connected with outlet conduit 26.

Finally, the box 18 is permanently maintained under negative pressure by action of the vacuum pump connected therewith through aperture 21 and pipe 22. This negative pressure may be established due to the fluid-tight contact existing between shoes 19–20 and resilient seals 20a on the one hand, and the hollow ring 13 with partitions 14 on the other hand. The water level is thus higher in box 18 than in the lower part of drum 3 near the opening of pipe 27. The said negative pressure exerts through the corresponding part of perforated wall 4 a suction effect which increases the flow of water passing through the filter cake in spite of the thickness of the latter in zone 32. This water being filtered is thus perfectly clear and it is drained out of drum 3 through aperture 23 and pipe 24.

Moreover, it will be understood that when the filter cake passes through zone 34 situated above the water level, it is submitted to a very efficient drying due to the suction effect of box 18, said suction being exerted up to the fluid-tight shoe 19.

A rotary drum filter according to my invention may of course comprise a bucket 15, a box 18 and/or a carrying and driving mechanism of rotary drum 3 of any form or disposition. There may also be used any conventional seals instead of lip-seals 11, and there may be provided a plurality of adjacent hollow rings 13 within drum 3.

I claim:

1. A whitening and recovery rotary drum filter for paper-making machines comprising: a cylindrical and hollow rotary drum with perforated peripheral wall rotating about a horizontal axis; two hollow trunnions coaxial therewith and rigidly secured to said drum; an internal hollow ring situated in the middle portion of said drum; a filtering cloth outwardly coating said perforated peripheral wall; a cylindrical collector inwardly facing said perforated wall and opening in its middle portion into said hollow ring; a plurality of internal partitions radially disposed between said collector and said perforated wall, said partitions inwardly extending at their middle portion into said hollow ring through apertures disposed on said collector; a vat rotatably supporting said trunnions of said drum and containing water to be filtered in which said rotary drum is almost completely immersed; within said drum and at its middle part, two stationary devices of adjustable orientation along which said partitions and ring may rotate in fluid-tight relationship, said two devices consisting of a bucket gathering water with additives and a vacuum box receiving clear water at its upper part; a pipe collecting clean water at the lowermost inner part of said drum; and a discharge roller outwardly disposed at the upper emerging part of said drum and over which passes a filter cake of fibrous materials having been progressively deposited onto said rotary drum before being partly dried by suction effect when passing over said vacuum box.

2. A rotary drum filter as claimed in claim 1, said water gathering bucket being radially disposed inside said rotary drum and being connected at its lower part with a drain off pipe outwardly extending through one of said hollow trunnions of said rotary drum.

3. A rotary drum filter as claimed in claim 1, said vacuum box comprising: at its upper part an aperture connected with a pipe under negative pressure outwardly extending through one of said hollow trunnions of said rotary drum up to a vacuum pump; at its middle part an outlet aperture through which water may flow out of said rotary drum by means of a pipe outwardly extending through one of said hollow trunnions of said rotary drum; at its lower part outlet tubes opening on both sides of said hollow ring near the lowermost generatrix of said cylindrical rotary drum.

4. A rotary drum filter as claimed in claim 1, said vat comprising an inlet pipe opening at its lowermost point and fluid-tight rotary seals laterally disposed around said rotary hollow trunnions in the zone where they pass through the side walls of said vat.

5. A whitening and recovery rotary drum filter for paper-making machines comprising: a cylindrical and hollow rotary drum with perforated peripheral wall rotating about a horizontal axis; two hollow trunnions coaxial therewith and rigidly secured to said drum; an internal hollow ring situated in the middle portion of said drum; a filtering cloth outwardly coating said perforated peripheral wall; a cylindrical collector inwardly facing said perforated wall and opening in its middle portion into said hollow ring; a plurality of internal partitions radially disposed between said collector and said perforated wall, said partitions inwardly extending at their middle portion into said hollow ring through apertures disposed on said collector; a vat rotatably supporting said trunnions of said drum and containing water to be filtered in which said rotary drum is almost completely immersed; within said drum and at its middle part, two stationary devices of adjustable orientation along which said partitions and ring may rotate in fluid-tight relationship, said two devices consisting of a bucket gathering water with additives and a vacuum box receiving limpid water at its upper part; a pipe collecting clean water at the lowermost inner part of said drum; and a discharge roller outwardly disposed at the upper emerging part of said drum and over which passes a filter cake of fibrous materials having been progressively deposited onto said rotary drum before being partly dried by suction effect when passing over said vacuum box.

6. A rotary drum filter as claimed in claim 5, said water gathering bucket being radially disposed inside said rotary drum and being connected at its lower part with a drain off pipe outwardly extending through one of said hollow trunnions of said rotary drum.

7. A rotary drum filter as claimed in claim 5, said vacuum box comprising: at its upper part an aperture connected with a pipe under negative pressure outwardly extending through one of said hollow trunnions of said rotary drum up to a vacuum pump; at its middle part an outlet aperture through which water may flow out of said rotary drum by means of a pipe outwardly extending through one of said hollow trunnions of said rotary drum; at its lower part outlet tubes opening on both sides of said hollow ring near the lowermost generatrix of said cylindrical rotary drum.

8. A rotary drum filter as claimed in claim 5, said vat comprising an inlet pipe opening at its lowermost point and fluid-tight rotary seals laterally disposed around said rotary hollow trunnions in the zone where they pass through the side walls of said vat.

References Cited by the Examiner

UNITED STATES PATENTS

| | | | |
|---|---|---|---|
| 622,439 | 4/1899 | Bergstrom | 210—402 X |
| 917,305 | 4/1909 | Johnson | 210—402 |
| 2,765,085 | 10/1956 | Strindlund | 210—402 X |
| 3,000,507 | 9/1961 | Young | 210—402 |

REUBEN FRIEDMAN, *Primary Examiner.*

S. ZAHARNA, *Assistant Examiner.*